United States Patent [19]
Pinch et al.

[11] Patent Number: 6,086,162
[45] Date of Patent: Jul. 11, 2000

[54] MOTOR VEHICLE REAR AXLE AND METHOD

[75] Inventors: William De Witt Pinch, Dearborn; David H. Henning, Rochester Hills, both of Mich.

[73] Assignee: General Motors Corporation, Detroit, Mich.

[21] Appl. No.: 09/210,648

[22] Filed: Dec. 14, 1998

[51] Int. Cl.[7] ................................................. B60B 35/06
[52] U.S. Cl. .................. 301/124.1; 301/127; 228/185; 228/265; 280/124.16; 280/124.128
[58] Field of Search ................ 280/124.106, 124.107, 280/124.116, 124.128; 301/124.1, 127; 228/265, 185; 219/78.16, 91.23, 117.1, 137 R; 91/375 A; 267/188, 154; 464/86, 97

[56] References Cited

U.S. PATENT DOCUMENTS

| | | | |
|---|---|---|---|
| 3,766,633 | 10/1973 | Lehrheuer et al. | 29/470.5 |
| 3,854,030 | 12/1974 | Roye | 219/150 |
| 4,256,253 | 3/1981 | Nishiwaki | 228/112 |
| 4,637,628 | 1/1987 | Perkins | 228/689 |
| 4,750,757 | 6/1988 | Long | 280/124.106 |
| 5,411,287 | 5/1995 | Herscher | 301/127 |

FOREIGN PATENT DOCUMENTS

| | | |
|---|---|---|
| 0122891 | 10/1984 | European Pat. Off. . |
| 0136269 | 4/1985 | European Pat. Off. . |
| 3730338 | 10/1990 | Germany . |
| 4416725 | 11/1995 | Germany . |

OTHER PUBLICATIONS

English Abstract for DE 3730338 From Derwent.

*Primary Examiner*—S. Joseph Morano
*Assistant Examiner*—Jason R. Bellinger
*Attorney, Agent, or Firm*—Jeffrey A. Sedlar

[57] ABSTRACT

A motor vehicle rear axle including a pair of longitudinal control arms made of cast iron or aluminum and a transverse torsion bar made of steel. Each control arm has a first end hinged to a body of the motor vehicle for up and down pivotal movement, a second end at which a wheel spindle is rigidly attached, and a socket facing the other control arm. Each socket has a diametrically opposite pair of apertures therein. The torsion bar has a pair of opposite terminal ends which are formed to match and interference fitted in respective ones of the control arm sockets. A pair of plugs in each of the pair of diametrically opposite apertures in the control arm sockets are fusion bonded to corresponding ones of the terminal ends of the torsion bar. The fusion bonded plugs define lugs in the apertures which torsionally reinforce the interference fit between the terminal ends of the torsion bar and the control arm sockets and which positively prevent dislodgment of the terminal ends from the control arm sockets.

4 Claims, 3 Drawing Sheets

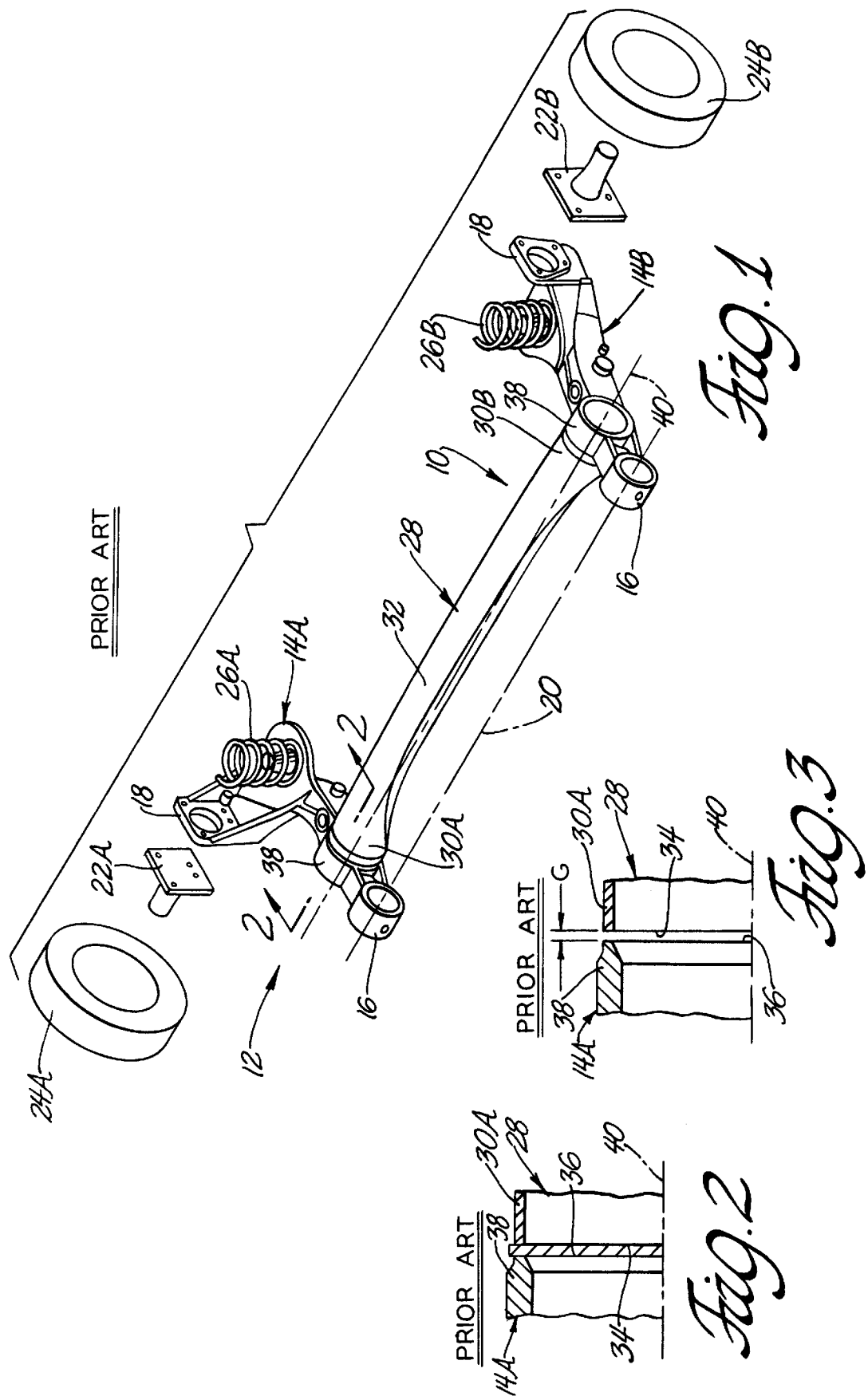

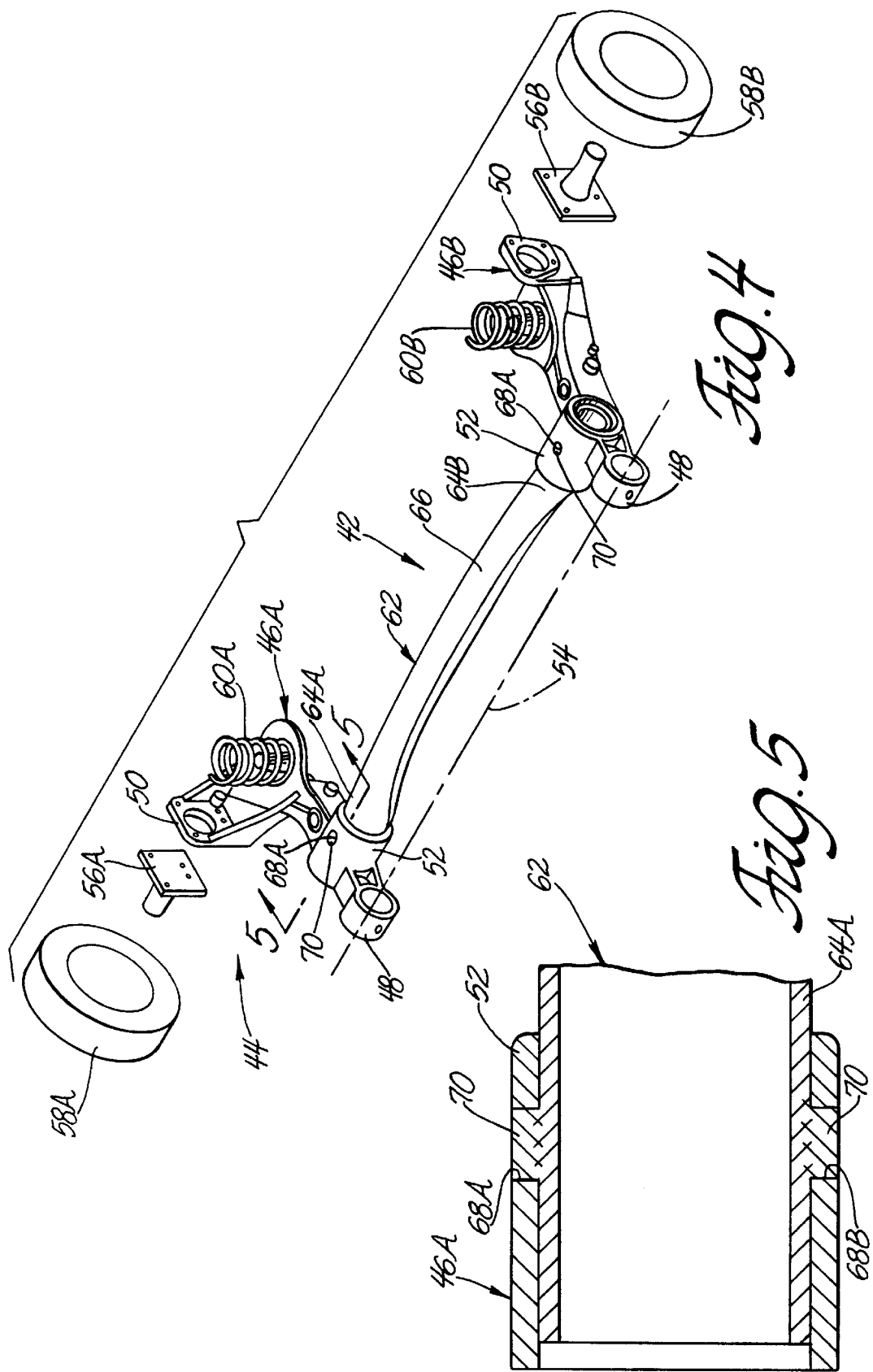

6,086,162

MOTOR VEHICLE REAR AXLE AND METHOD

TECHNICAL FIELD

This invention relates to a rear axle for a motor vehicle and a method of making the same.

BACKGROUND OF THE INVENTION

A rear axle in a motor vehicle rear suspension system referred to alternatively as a "trailing arm", "twist axle", or "compound crank" suspension system includes a pair of longitudinal control arms usually made of cast iron or aluminum and a transverse torsion bar usually made of steel. Each control arm has a first end hinged to a body of the motor vehicle for up and down pivotal movement and a second end at which a wheel spindle is rigidly attached. Respective ones of a pair of rear road wheels are rotatably mounted on the wheel spindles and guided in vertical suspension excursions relative to the body of the motor vehicle by the control arms. Respective ones of a pair of primary suspension springs are disposed between the control arms and the body of the motor vehicle. Commonly, the torsion bar has a channel-shaped or C-shaped cross section except at respective ones of a pair of opposite terminal ends thereof which are rolled or otherwise formed into right circular cylinders. The circular edges of the terminal ends of the torsion bar are welded to respective ones of the control arms. The torsion bar flexes resiliently in bending and in torsion in response to unequal suspension excursions of the control arms to supplement the primary suspension springs. A rear axle according to this invention is a novel alternative to the known rear axle just described.

SUMMARY OF THE INVENTION

This invention is a new and improved rear axle for a trailing arm rear suspension of a motor vehicle including a pair of longitudinal control arms made of a first metal, e.g. cast iron or aluminum, and a transverse torsion bar made of a second metal, e.g. steel. Each control arm has a first end hinged to a body of the motor vehicle for up and down pivotal movement, a second end at which a wheel spindle is rigidly attached, and a tubular socket facing the other control arm. Each tubular socket has a diametrically opposite pair of apertures therein. The torsion bar has a channel-shaped or C-shaped cross section except at respective ones of a pair of opposite terminal ends thereof which are rolled or otherwise formed into right circular cylinders and interference fitted in respective ones of the tubular sockets in the control arms. A plurality of plugs in each of the pair of diametrically opposite apertures in the tubular sockets are fusion bonded to corresponding ones of the terminal ends of the torsion bar. The fusion bonded plugs define lugs in the apertures in the tubular sockets which torsionally reinforce the interference fit between the terminal ends of the torsion bar and the tubular sockets in the control arms and which positively prevent dislodgment of the terminal ends from the tubular sockets.

BRIEF DESCRIPTION OF THE DRAWINGS

FIG. 1 is a perspective view of a prior art rear axle for a motor vehicle trailing arm rear suspension system;

FIG. 2 is a sectional view taken generally along the plane indicated by lines 2—2 in FIG. 1

FIG. 3 is similar to FIG. 2 showing but structural elements of the prior art rear axle in different relative positions;

FIG. 4 is a perspective view of a rear axle according to this invention for a motor vehicle trailing arm rear suspension system;

FIG. 5 is a sectional view taken generally along the plane indicated by lines 5—5 in FIG. 4.

DESCRIPTION OF THE PREFERRED EMBODIMENT

Figure 6:
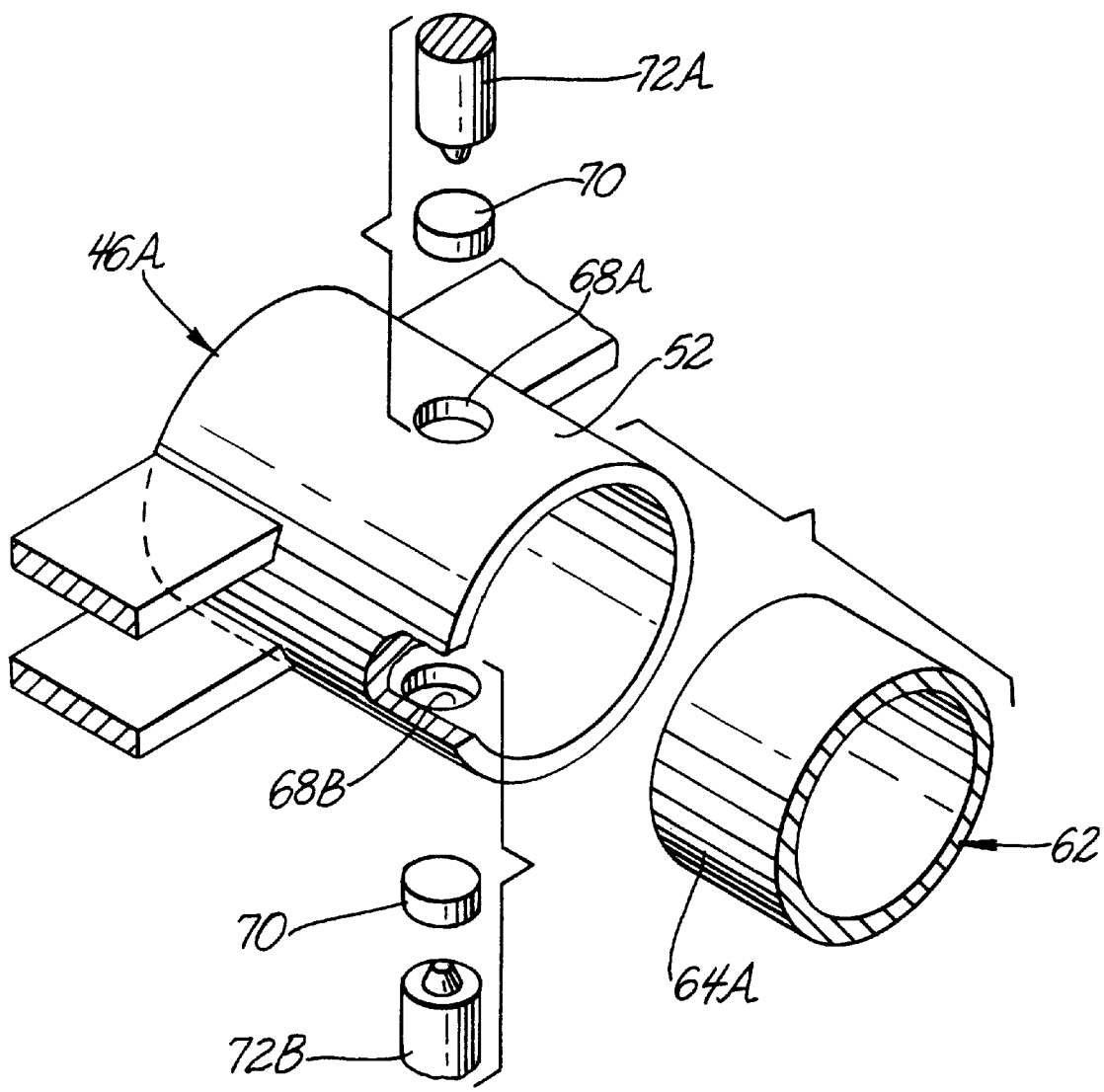
FIG. 6 is a fragmentary exploded perspective view of the rear axle according to this invention.

Referring to FIGS. 1–3, a prior art rear axle 10 for a motor vehicle trailing arm rear suspension system 12 includes a pair of longitudinal control arms 14A, 14B made of cast iron or aluminum each having a boss 16 at a first end and a vertical flange 18 at a second end. The control arms are hinged to a body, not shown, of the motor vehicle at the bosses 16 for up and down pivotal movement about a lateral centerline 20. A pair of wheel spindles 22A,22B are bolted to respective ones of the control arms at the flanges 18 thereon. A pair of schematically represented rear road wheels 24A,24B of the motor vehicle are rotatably supported on respective ones of the wheel spindles 22A,22B and guided in vertical suspension excursions relative to the vehicle body by the control arms 14A,14B. A pair of primary suspension springs 26A,26B are disposed between the vehicle body and respective ones of the control arms 14A, 14B.

The rear axle 10 further includes a transverse torsion bar 28 made of steel between the longitudinal control arms 14A,14B. The torsion bar 28 has a pair of terminal ends 30A,30B rolled or otherwise formed as right circular cylinders and a body 32 between the terminal ends which is C-shaped or channel-shaped in cross section. Each of the terminal ends 30A,30B is rigidly attached to a corresponding one of the control arms 14A,14B by a fusion bond between a circular edge 34 of the terminal end and a circular edge 36 of a cylindrical boss 38 on the control arm. The torsion bar 28 flexes resiliently in bending and in torsion in response to unequal suspension excursions of the control arms 14A, 14B to supplement the primary suspension springs 26A,26B.

Commonly, the dissimilar metals from which the torsion bar 28 and the control arms 14A,14B are made are fusion bonded by magnet arc welding which requires a plurality of time consuming and costly manufacturing steps. For example, prior to welding, the circular edges 34,36 of the terminal ends of the torsion bar and of the cylindrical bosses 38 must be machined with relative precision and held stationary in planes perpendicular to a longitudinal centerline 40 of the torsion bar across a gap "G", FIG. 3. In order to maximize the structural integrity of the fusion bond between the circular edges 34,36, relatively precise and costly to maintain manufacturing tolerances attach to the gap "G" and to parallelism between the facing circular edges 34,36. In addition, the multiplicity of manufacturing steps associated with magnet arc welding contribute to high manufacturing cycle times which further increases manufacturing cost.

DESCRIPTION OF A PREFERRED EMBODIMENT OF THE INVENTION

Referring to FIGS. 4–6, a rear axle 42 according to this invention for a motor vehicle trailing arm rear suspension system 44 includes a pair of longitudinal control arms 46A,46B made of a first metal, e.g. cast iron or aluminum, each having a boss 48 at a first end, a vertical flange 50 at a second end, and a tubular socket 52 between the first and the second ends facing the other control arm. The tubular socket may have any convenient shape, e.g. cylindrical, square, oval or the like. The control arms are hinged to a body, not shown, of the motor vehicle at the bosses 48 for up and down pivotal movement about a lateral centerline 54. A pair of wheel spindles 56A,56B are bolted to respective ones of the control arms 46A,46B at the flanges 50 thereon. A pair of schematically represented rear road wheels 58A, 58B of the motor vehicle are rotatably supported on respective ones of the wheel spindles 56A,56B and guided in vertical suspension excursions relative to the vehicle body by the control arms 46A,46B. A pair of primary suspension springs 60A,60B are disposed between the vehicle body and respective ones of the control arms 46A,46B.

The rear axle 42 further includes a transverse torsion bar 62 made of steel between the longitudinal control arms 46A,46B. The torsion bar 62 has a pair of terminal ends 64A,64B rolled or otherwise formed as right circular cylinders to match the shape of the tubular sockets 52 and a body 66 between the terminal ends which is C-shaped or channel-shaped in cross section. In the circumstance that the sockets 52 have shapes other than cylindrical, the terminal ends 64A,64B are shaped to match. Each of the terminal ends 64A,64B is interference fitted in a corresponding one of the tubular sockets 52 to rigidly couple the control arms 46A, 46B to the torsion bar. The torsion bar flexes resiliently in bending and in torsion in response to unequal suspension excursions of the control arms 46A,46B to supplement the primary suspension springs 60A,60B.

As seen best in FIGS. 5–6, each of the tubular sockets 52 in the control arms 46A,46B has a plurality of two diametrically opposite apertures 68A,68B therein. Respective ones of a corresponding plurality of plugs 70 made of a metal which is easily fusion bonded to the metal from which the torsion bar 62 is made are deposited in the apertures 68A, 68B after the terminal ends 64A,64B are interference fitted in the tubular sockets 52. The plugs 70 are then fusion bonded to the terminal ends 64A,64B of the torsion bar by respective ones of a pair of schematically represented electrodes 72A,72B of a welding apparatus, not shown, which press the plugs against the terminal ends while heating the interface therebetween to fusion temperature. While the plugs 70 are hot from the fusion process, they are physically deformed by the press load applied by the electrodes 72A, 72B so that the plugs completely fill the apertures 68A,68B.

After being thus fusion bonded to the terminal ends 64A,64B, the plugs 70 define lugs on the torsion bar in the apertures 68A,68B which torsionally reinforce the rigid connection afforded by the aforesaid interference fit between the terminal ends and the tubular sockets 52 and which positively prevent dislodgment of the terminal ends from the tubular sockets.

Importantly, the manufacturing steps required to achieve the aforesaid interference fit between the terminal ends 64A,64B and the tubular sockets 52 are less costly than the aforesaid manufacturing steps required to magnet arc weld the terminal ends of the torsion bar to the control arms. For example, manufacturing tolerances on the terminal ends 64A,64B and on the tubular sockets 52 are less restrictive than the aforesaid manufacturing tolerances on the circular edges 34,36 on the terminal ends and the cylindrical bosses of the prior art rear axle 10. In addition, the interference fits between the terminal ends 64A,64B and the tubular sockets 52 eliminate expensive holding devices required to magnet arc weld the control arms 14A,14B and the torsion bar 28 of the prior art rear axle 10 so that manufacturing cycle times are improved. Further, because the plugs 70 are fusion bonded only to the terminal ends 64A,64B of the torsion bar and not also to the control arms 46A,46B, the materials from which the torsion bar and the control arms are made are not required to be compatible for fusion welding and problems associated with fusion welding different materials are avoided.

Having thus described the invention, what is claimed is:

1. A motor vehicle rear axle comprising:

a pair of longitudinal control arms made of a first metal each having a first end and a second end and a socket between said first and said second ends facing the other of said pair of longitudinal control arms, a transverse torsion bar made of a second metal between said pair of longitudinal control arms having a pair of opposite terminal ends each formed to a shape matching the shape of said control arm sockets and interference fitted in respective ones of said control arm sockets to rigidly couple said transverse torsion bar and each of said pair of longitudinal control arms, an aperture in said socket in each of said pair of longitudinal control arms exposing the corresponding one of said pair of opposite terminal ends of said torsion bar therein, and a plug in each of said apertures in said sockets fusion bonded to the corresponding one of said opposite terminal ends of said torsion bar therein and defining a lug on the corresponding one of said opposite terminal ends of said torsion bar reinforcing the interference fit thereof in said socket and positively preventing dislodgment thereof from said socket.

2. The motor vehicle rear axle recited in claim 1 wherein:

said first metal is selected from a group consisting of cast iron and aluminum, and said second metal is steel.

3. A method of making a rear axle for a motor vehicle including a pair of longitudinal control arms each having a first end and a second end, and a transverse torsion bar between said longitudinal control arms, comprising the steps of:

forming a socket in each of said longitudinal control arms between said first and said second ends thereof facing the other of said pair of longitudinal control arms, forming on said transverse torsion bar a pair of opposite terminal ends each having a shape matching the shape of said control arm sockets, rigidly coupling said transverse torsion bar to each of said pair of longitudinal control arms by interference fitting each of said pair of opposite terminal ends of said torsion bar into said socket in a corresponding one of said longitudinal control arms, forming an aperture in said socket in each of said longitudinal control arms exposing the corresponding one of said pair of opposite terminal ends of said torsion bar therein, depositing a plug in each of said apertures, and fusion bonding said plug in each of said apertures to the corresponding one of said pair of opposite terminal ends of said torsion bar so that each of said plugs defines a lug on the corresponding one of said pair of opposite terminal ends of said torsion bar reinforcing the interference fit thereof in said tubular socket and positively preventing dislodgment thereof from said tubular socket.

4. The method of making a rear axle for a motor vehicle recited in claim 3 wherein the step of fusion bonding said plug in each of said apertures to the corresponding one of said pair of opposite terminal ends of said torsion bar further comprises:

concurrently deforming each of said plugs by applying pressure thereto so that each of said plugs expands and completely fills said aperture in the corresponding one of said control arm sockets.

* * * * *